United States Patent
Filip et al.

(10) Patent No.: US 10,400,389 B2
(45) Date of Patent: Sep. 3, 2019

(54) COMPOSITE FRICTION MATERIALS HAVING CARBON NANOTUBE AND CARBON NANOFIBER FRICTION ENHANCERS

(71) Applicants: Peter Filip, Carbondale, IL (US); David N. Bortz, Cleveland, OH (US); Brian Howells, Cleveland, OH (US); Ashley R. Kelm, Cleveland, OH (US); Tod Policandriotes, Carbondale, IL (US)

(72) Inventors: Peter Filip, Carbondale, IL (US); David N. Bortz, Cleveland, OH (US); Brian Howells, Cleveland, OH (US); Ashley R. Kelm, Cleveland, OH (US); Tod Policandriotes, Carbondale, IL (US)

(73) Assignees: BOARD OF TRUSTEES AT SOUTHERN ILLINOIS UNIVERSITY, Carbondale, IL (US); TRIBCO INC., Cleveland, OH (US)

( * ) Notice: Subject to any disclaimer, the term of this patent is extended or adjusted under 35 U.S.C. 154(b) by 623 days.

(21) Appl. No.: 14/308,692

(22) Filed: Jun. 18, 2014

(65) Prior Publication Data
US 2015/0368856 A1 Dec. 24, 2015
US 2016/0153137 A9 Jun. 2, 2016

Related U.S. Application Data

(63) Continuation of application No. 11/548,365, filed on Oct. 11, 2006, now abandoned.
(Continued)

(51) Int. Cl.
*D06M 11/74* (2006.01)
*B32B 27/04* (2006.01)
(Continued)

(52) U.S. Cl.
CPC ........ *D06M 11/74* (2013.01); *B29C 70/025* (2013.01); *B29C 70/081* (2013.01); *B32B 5/022* (2013.01);
(Continued)

(58) Field of Classification Search
USPC .... 188/251 A; 442/101, 136, 147, 148, 164; 428/36.9, 65.9, 65, 260, 282, 283, 286,
(Continued)

(56) References Cited

U.S. PATENT DOCUMENTS 2,992,136 A  7/1961 Shipe
5,646,076 A  7/1997 Bortz
(Continued)

FOREIGN PATENT DOCUMENTS

EP  1473130 A1  11/2004
WO  WO-9101621 A2  2/1991
WO  WO-2007044889 A2  4/2007

OTHER PUBLICATIONS

International Preliminary Report on Patentability for PCT/US2006/040036 dated Apr. 16, 2008 5 pages.
(Continued)

*Primary Examiner* — Lynda Salvatore
(74) *Attorney, Agent, or Firm* — Harness, Dickey & Pierce, P.L.C.

(57) ABSTRACT

A textile-reinforced composite friction material is provided by the present invention that includes a nonwoven needlepunched fiber mat, a resin matrix impregnated within and onto the fiber mat, and a carbon nanomaterial dispersed within the resin matrix. The carbon nanomaterial is preferably carbon nanotubes and/or carbon nanofibers.

17 Claims, 7 Drawing Sheets

Related U.S. Application Data

(60) Provisional application No. 60/725,776, filed on Oct. 11, 2005.

(51) Int. Cl.

| | |
|---|---|
| *B82Y 30/00* | (2011.01) |
| *C08J 5/00* | (2006.01) |
| *C08J 5/10* | (2006.01) |
| *F16D 69/02* | (2006.01) |
| *B32B 5/02* | (2006.01) |
| *B32B 15/14* | (2006.01) |
| *B32B 27/12* | (2006.01) |
| *B32B 27/28* | (2006.01) |
| *B29C 70/02* | (2006.01) |
| *B29C 70/08* | (2006.01) |
| *D06M 15/59* | (2006.01) |
| *F16D 13/64* | (2006.01) |
| *B29L 31/16* | (2006.01) |
| *D06M 101/36* | (2006.01) |

(52) U.S. Cl.
CPC .............. *B32B 15/14* (2013.01); *B32B 27/04* (2013.01); *B32B 27/12* (2013.01); *B32B 27/281* (2013.01); *B82Y 30/00* (2013.01); *C08J 5/005* (2013.01); *C08J 5/10* (2013.01); *D06M 15/59* (2013.01); *F16D 13/64* (2013.01); *F16D 69/023* (2013.01); *F16D 69/026* (2013.01); *B29L 2031/16* (2013.01); *B32B 2260/021* (2013.01); *B32B 2260/046* (2013.01); *B32B 2262/0246* (2013.01); *B32B 2262/0269* (2013.01); *B32B 2262/101* (2013.01); *B32B 2262/105* (2013.01); *B32B 2262/106* (2013.01); *B32B 2264/108* (2013.01); *B32B 2307/744* (2013.01); *D06M 2101/36* (2013.01); *F16D 2200/0069* (2013.01); *F16D 2200/0086* (2013.01); *F16D 2200/0091* (2013.01); *Y10T 428/25* (2015.01); *Y10T 442/2344* (2015.04)

(58) Field of Classification Search
USPC .................. 428/287, 288, 290, 300, 281
See application file for complete search history.

(56) References Cited

U.S. PATENT DOCUMENTS

| | | |
|---|---|---|
| 5,989,375 A | 11/1999 | Bortz |
| 6,942,823 B2 | 9/2005 | Terada et al. |
| 2002/0183438 A1 | 12/2002 | Amarasekera et al. |
| 2004/0089851 A1 | 5/2004 | Wang et al. |
| 2005/0181209 A1* | 8/2005 | Karandikar ........... B22F 3/1103 428/408 |
| 2005/0186378 A1* | 8/2005 | Bhatt .................... B82Y 10/00 428/36.9 |
| 2005/0266757 A1 | 12/2005 | Roekens et al. |
| 2008/0176470 A1* | 7/2008 | Filip ..................... B32B 27/04 442/101 |

OTHER PUBLICATIONS

Sandler, et al., Ultra-low electrical percolation threshold in carbon-nanotube-epoxy composites, Polymer 44 (2003) 5893-5899.
Textile Glossary. Celanese AcetateLLC.Copyright 2001. pp. 62 and 105.
Zhenya, et al., Study on frictional property of brake pad synthesized by modified phenolic resin with nano-materials Feijinshukuang, (2004), 27(5), pp. 51-53.
International Search Report and Written Opinion from corresponding PCT Application No. PCT/US06/40036 dated Aug. 29, 2007 pp. 8.

* cited by examiner

COMPOSITE FRICTION MATERIALS HAVING CARBON NANOTUBE AND CARBON NANOFIBER FRICTION ENHANCERS

CROSS-REFERENCE TO RELATED APPLICATIONS

This application claims the benefit of U.S. Provisional Patent Application Ser. No. 60/725,776, filed Oct. 11, 2005, the entire disclosure of which is incorporated herein by reference.

FIELD

The present invention relates generally to friction materials, and more specifically to drylaid non-woven needlepunched textile-reinforced polymer composite friction materials.

BACKGROUND

Friction products having nonwoven needlepunched textile-reinforced composite (NNTRC) materials have demonstrated effective performance in a variety of applications. NNTRCs have facilitated the incorporation of fibers and binder matrix resins in composites that previously were not commonly used. Their fibrous structures and resulting friction properties are unique to friction and demonstrate heat transfer through a composite open porosity which is mainly composed of the fiber and resin. In some applications, nonwoven wetlaid materials such as paper may replace the NNTRC's.

Known powdered and particulate fillers, while being claimed as used in up to 40% by weight of the composite, (a level at which fillers would have a noticeable influence over the mechanical properties and character of the whole composite), have not yet been commercially successful or readily incorporated into NNTRC products in greater than about 3% by weight. These fillers are meant to "fill" rather than affect the composite, and have to date only made minor contributions to properties, performance, and reduced cost. Additionally, specification of the fillers on a weight basis, as is the convention, ignores the consideration of the particle in the area of the critical friction surface as it rubs an opposing surface, as friction properties are a function of the population and volume of particles actually engaged in friction. Moreover, especially at higher loadings of filler, the bulk composite porosity is influenced. Thus, fillers have not made dramatic improvements in friction NNTRCs.

SUMMARY

In one preferred form, a material of the present invention includes a composite friction material comprising, a fiber mat, a resin matrix impregnated in the fiber mat, and a carbon nanomaterial dispersed within the resin matrix. The carbon nanomaterial is preferably selected from a group consisting of carbon nanotubes and/or carbon nanofibers, and furthermore preferably defines between approximately 0.004 and approximately 0.080 by volume fraction of the composite friction material.

The inventors believe that improved properties can result from delivering particles of enlarged surface area having unique surface energies, quantum and small size effects to the friction surface and advantageously distributed more uniformly on the basis of their volume fraction of total matter. Accordingly, embodiments of the invention utilize these carbon nanotube and carbon nanofiber materials in composites, particularly NNTRC composites, as friction enhancers and friction enhancing particles. They improve friction properties using minor proportional additions and are distinctly separate, although may be used in conjunction with, those particles that are used to fill the product.

In another form, the present invention includes a part for use in a friction application comprising a backing and a friction element attached to the backing, wherein the friction element comprises a composite with nanomaterial dispersed within and together attached to a carrier substrate. The part may include, by way of example, a dry brake plate, a wet brake plate, a clutch plate, a transmission friction disc, a transmission band, a brake band, a torque converter lining, a slip differential, or synchronizer friction element, and a brake pad or block, among others.

In yet another form, the present invention includes a composite material for use in friction applications comprising a nanomaterial selected from the group consisting of carbon nanotubes and carbon nanofibers.

In still another form, the present invention includes a composite friction material comprising a drylaid nonwoven needlepunched textile-reinforced fiber mat, a resin matrix impregnated into and onto the fiber mat, and a carbon nanomaterial selected from the group consisting of carbon nanotubes and carbon nanofibers dispersed and distributed to furnish a volume fraction of friction enhancing particles at the friction surface.

According to one embodiment of a method of the present invention, a composite friction material is formed by preparing a nonwoven carded and needlepunched fiber mat, dispersing a carbon nanomaterial selected from the group consisting of carbon nanotubes and/or carbon nanofibers within a resin, and saturating the fiber mat with the resin containing the nanomaterial thereby overcoming at least some of the difficulties in molding friction materials which might attempt to utilize such materials and dispersing and distributing them on the basis of volume fraction at the friction surface.

In another method of the present invention, a composite friction material preform is formed by depositing a carbon nanomaterial onto a fiber web, batt or mat. This can be done during the processes of opening, blending, and working. carding, crosslapping and/or needlepunching to achieve a desired volume fraction of carbon nanomaterial at the friction surface. The mat and carbon nanomaterial is then impregnated with a resin.

The methods and friction products of the various embodiments of this invention provide friction products with improved friction properties, and particularly nonwoven needlepunched textile-reinforced composites with improved friction properties. Some of the embodiments provide friction products that show improved coefficients of friction at increased energy engagements and elevated temperatures. Some of the embodiments provide friction products that show reduced heat fade. These products can be useful in dry and wet brake, clutch, transmission, torque converter and slip differentials Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying photomicrographs and drawings, wherein.

Corresponding reference numerals indicate corresponding parts throughout the several views of the drawings.

DETAILED DESCRIPTION

The following description of the preferred embodiments is merely exemplary in nature and is in no way intended to limit the invention, its application, or uses.

Nanomaterials have physical structures with extremely large surface areas per material particle. Nanomaterials demonstrate increased mechanical and other properties that are not indicated by their chemistry. For instance, clay/polymer nanocomposites show increased mechanical and heat distortion properties separately of their expected chemistry. These new properties are likely due to hydrogen bonding between an increased exposed surface of nano particle and, for example, a polymer matrix in a composite.

Carbon particles and graphite fibers are of known benefit in friction products, and thus specific nanomaterials such as those of carbon have been developed as a friction material according to the teachings of the present invention. More specifically, carbon nanotubes and carbon nanofibers have been found to be novel additions to friction materials according to the present invention. However, difficulties in dispersing carbon nanomaterials in common drylaid and molded friction products has prevented utilization of these enhancers in friction materials, whereas the present invention can produce a desired product with the enhancers dispersed advantageously at the friction surface.

Unlike powders and prior art carbon materials, carbon nanotubes and carbon nanofibers are microscopic single and multi-walled tubes which, since they have sufficiently large aspect ratios, are fibers rather than powders or just particles. According to the present invention, carbon nanotubes and carbon nanofibers have been found to improve friction properties using minor proportional additions and are distinctly separate, although may be used in conjunction with, those particles that are typically used to fill a friction product or part.

The carbon nanotubes and carbon nanofibers are made of carbon by various techniques including electric arc, laser, and chemical vapor deposition. Unlike normal carbon and graphite powders and fibers, carbon nanotubes and carbon nanofiber materials have reported structures with chemically active areas in the range of approximately 300-700 $m^2$/gm. Additional geometry of carbon nanotubes include between approximately 5-100 μm in length and between approximately 1-100 nm in diameter. Carbon nanotubes can generally be described as a highly isotropic hexagonal networks of carbon atoms rolled up into a seamless, hollow cylinder, or concentric cylinders, with one or more walls and with ends capped with half of a fullerene molecule. Nanofibers, while larger than nanotubes, have similar structures, but with diameters of approximately 50-200 nm and aspect ratios on the order of approximately 100-500

Figure 1:
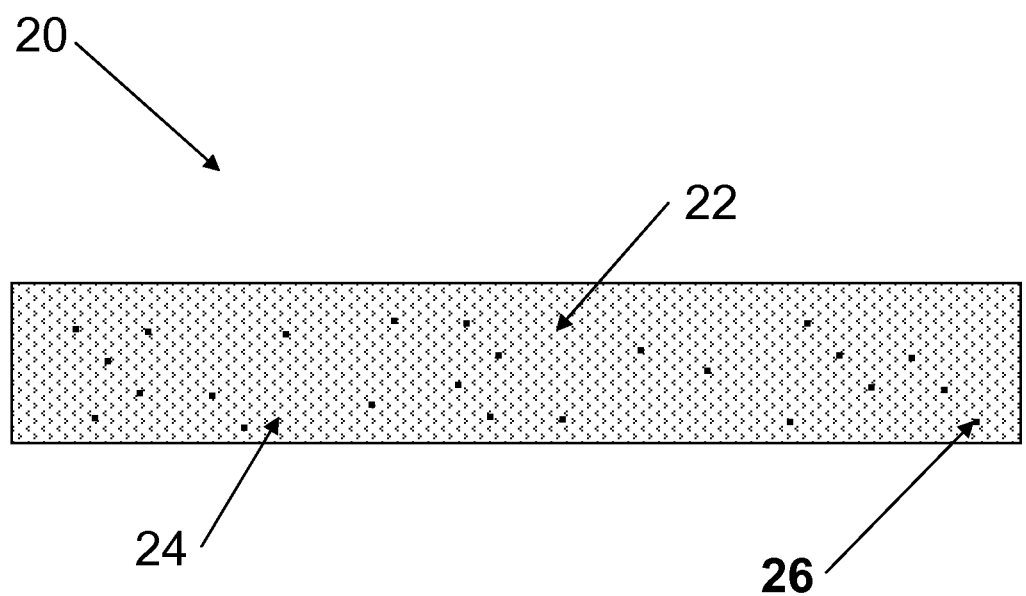
FIG. 1 is a cross-sectional view of a nonwoven needlepunched textile-reinforced polymer composite material having carbon nanomaterials dispersed therein in accordance with the principles of the present invention.

Referring now to FIG. 1, a composite friction material according to the present invention is illustrated and generally indicated by reference numeral 20. The composite friction material 20 comprises a fiber mat 22, a resin matrix 24 impregnated within the fiber mat 22, and a carbon nanomaterial 26 dispersed within the resin matrix 24. The carbon nanomaterial covers a portion of the friction surface of the friction material 20. (It should be understood that the FIG. 1 illustration is merely exemplary and is not to scale). Preferably, the fiber mat 22 is a nonwoven needlepunched mat The carbon nanomaterial is preferably carbon nanotubes and/or carbon nanofibers, and more specifically, in a volume fraction of between approximately 0.004 and approximately 0.080 of the overall composite friction material 20. However, the fraction of the surface area covered In addition to the carbon nanomaterial fillers, including carbon-based fillers such as carbon powders, carbon particles, or graphite fibers may be present. In one form, the carbon nanotubes define a geometry comprising approximately 50 to approximately 60 $m^2$/gm surface area, approximately 30 to approximately 100 μm length, and approximately 60 to approximately 150 nm diameter.

Preferably, the resin matrix is a thermoset polymer such as polyimide, phenolic, or epoxy. However, other thermoset polymers, or alternatively thermoplastic polymers, may also be employed as the resin matrix while remaining within the scope of the present invention.

The preferred fiber mat in one form of the invention is a staple Kevlar® material, while in other forms, the fiber mat comprises other aramids, glass, ceramic, polyacrylonitrile, staple carbon or staple graphite fibers (typically between 0.5 and 3.0 inches) and/or other appropriate fibers, preferably chosen for their friction properties. The fibers can be blended in various proportions and then combined with resin in fiber to resin proportions approximately from 20:80 to 80:20 and preferably 40:60 to 70:30.

In another example, glass defines approximately 80% by weight of the fiber mat, and polyacrylonitrile defines approximately 20% by weight of the fiber mat (in a fiber to resin ratio composite of 80:20). The specific gravity of the glass/polyacrylonitrile fiber mat is relatively high and thus approximately 30% less carbon nanotubes and/or carbon nanofibers on a weight basis are preferably employed.

Figure 2:
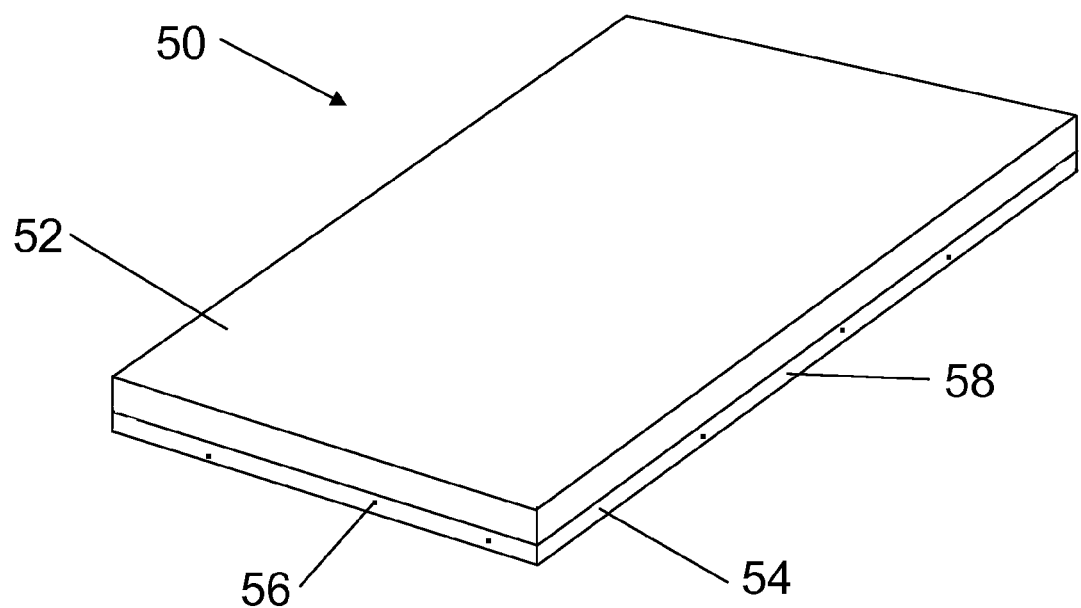
FIG. 2 is a perspective view of a part for use in a friction application and constructed in accordance with the principles of the present invention.

Referring now to FIG. 2, a friction product for use in a friction application is illustrated and generally indicated by reference numeral 50. The friction product 50 comprises a backing 52 and a friction element 54 attached to the backing. In accordance with the principles of the present invention, the friction element 54 comprises a nanomaterial 56 dispersed within a composite 58. Preferably, the composite 58 comprises a nonwoven needlepunched textile-reinforced fiber mat impregnated with a resin matrix as described above in connection with FIG. 1. The end application includes, by way of example, a dry brake plate, a wet brake plate, a clutch plate, a transmission friction disc, a transmission band, a brake band, a torque converter lining, a slip differential lining, or synchronizer friction element, and a brake pad or block, among others.

In one form, the backing 52 is a metal material, in another form, the backing 52 is a non-metal material in another form the backing 52 is a plastic material. Additionally, the friction element 54 is a lining or a facing, among other types of applications.

Figure 3:
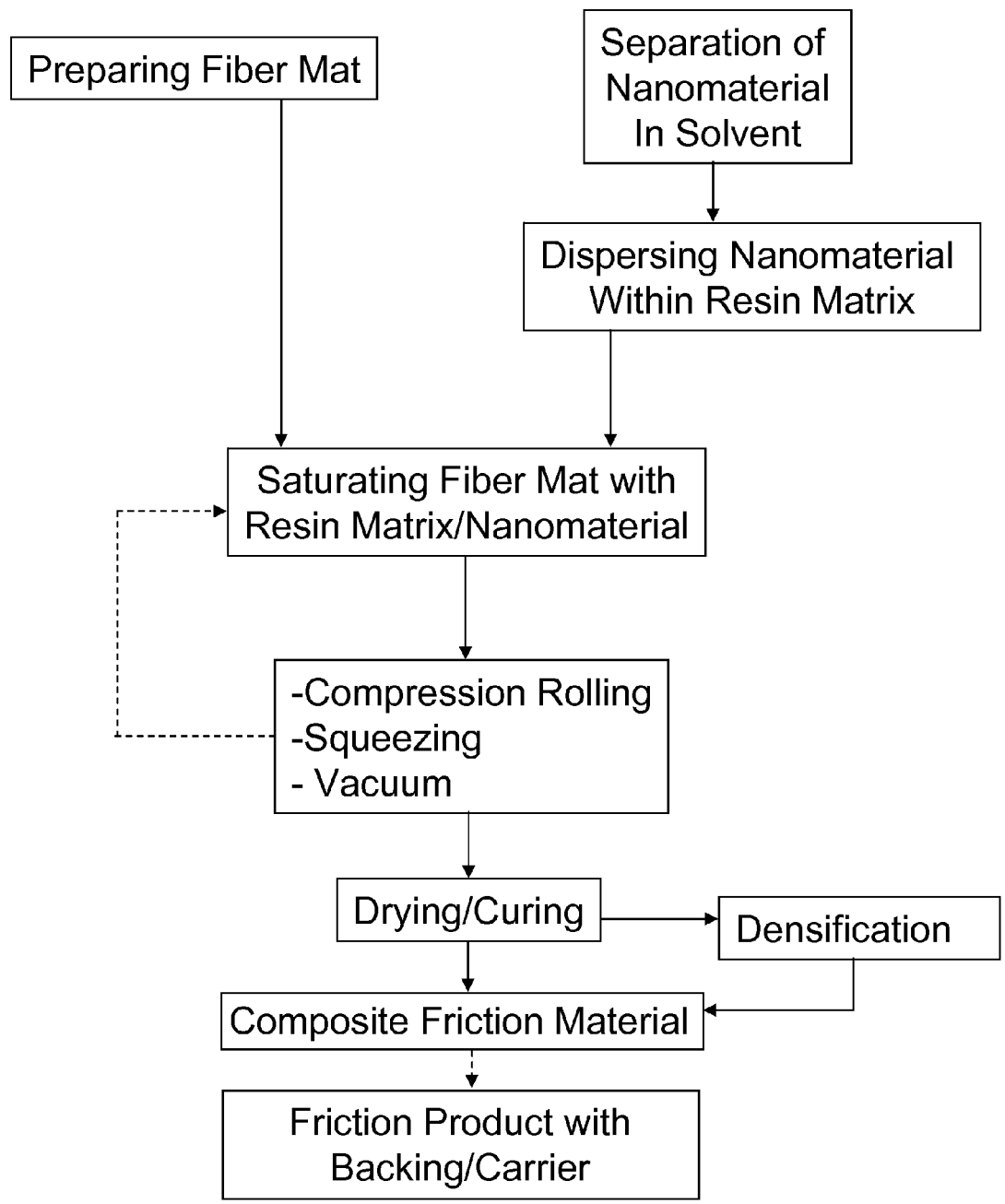
FIG. 3 is a process flow diagram illustrating a method of processing a nonwoven needlepunched textile-reinforced polymer composite material having carbon nanomaterials dispersed therein in accordance with the principles of the present invention.

Referring to FIG. 3, a method of processing a nonwoven needlepunched textile-reinforced polymer composite material having carbon nanomaterials dispersed therein is illustrated in accordance with the principles of the present invention. Generally, carded needlepunched mats, for friction applications are first prepared. (Alternatively, but not preferably, this may be done by depositing a carbon nanomaterial onto a fiber web, batt or mat some time during the fabrication of the nonwoven material.) Liquid resin to be impregnated into the needlepunch mat is prepared by dispersing carbon nanotubes and/or carbon nanofibers into the liquid to effect a homogeneous dispersion of separated particles, referred to hereinafter as a liquid suspension. In some instances, such a dispersion may require high-speed mixing and/or low viscosity dilutions in order to separate and disperse the particles. Separation of the carbon nanotubes and carbon nanofibers in solvent before mixing into the resin can also be employed in another form of the present invention.

The fiber mat is then saturated with the liquid suspension and is preferably compression rolled and squeezed to initiate the dispersion of carbon nanotubes and/or carbon nanofibers into the fiber mat. To optimize dispersion, multiple passes of saturation and compression are preferably combined or alternated with application of vacuum to the fiber mat and liquid suspension. The carbon nanotubes and/or carbon nanofibers are dispersed through the fiber mat so that upon drying the liquid resin and obtaining a dry polymer composite, the particles populate the friction surface without themselves substantially changing the porosity of the overall composite. Subsequently, the composite material is cured and its porosity is adjusted by compression as desired for a specific end application.

Figure 4:
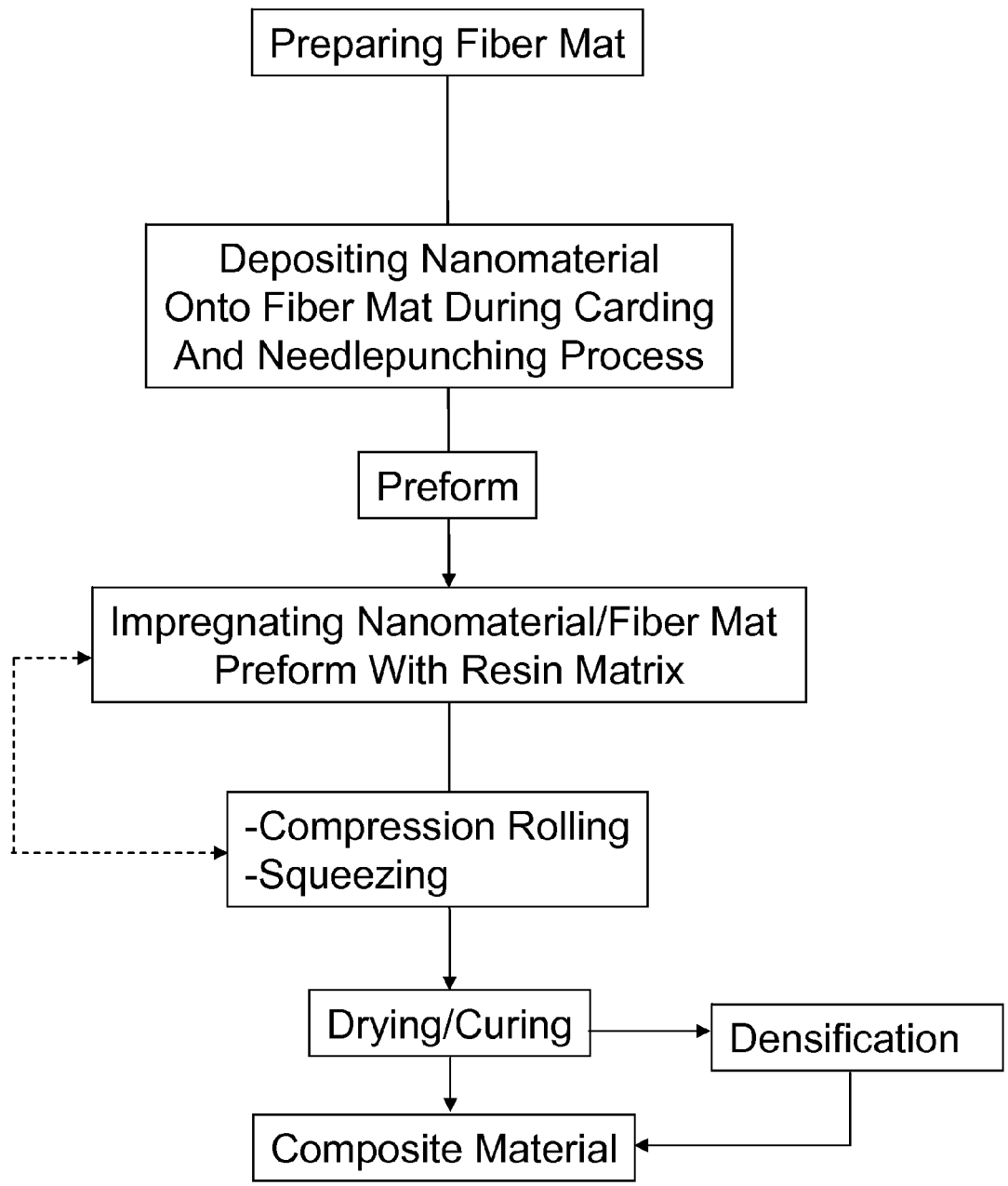
FIG. 4 is a process diagram illustrating another method of processing a nonwoven needlepunched textile-reinforced polymer composite material having carbon nanomaterials dispersed therein in accordance with the principles of the present invention

In FIG. 4, an alternate method of forming a composite material is illustrated, wherein a composite friction material preform is formed by depositing a carbon nanomaterial onto a fiber mat during a process such as, by way of example, carding and needlepunching. Additionally, the preform is impregnated with a resin material to form a composite friction material. The carbon nanotubes and/or carbon nanofibers can be dispersed, sprinkled in dry bulk or sprayed in liquid suspension on the fiber mat, for example, during the carding and needlepunching process.

Figure 5:
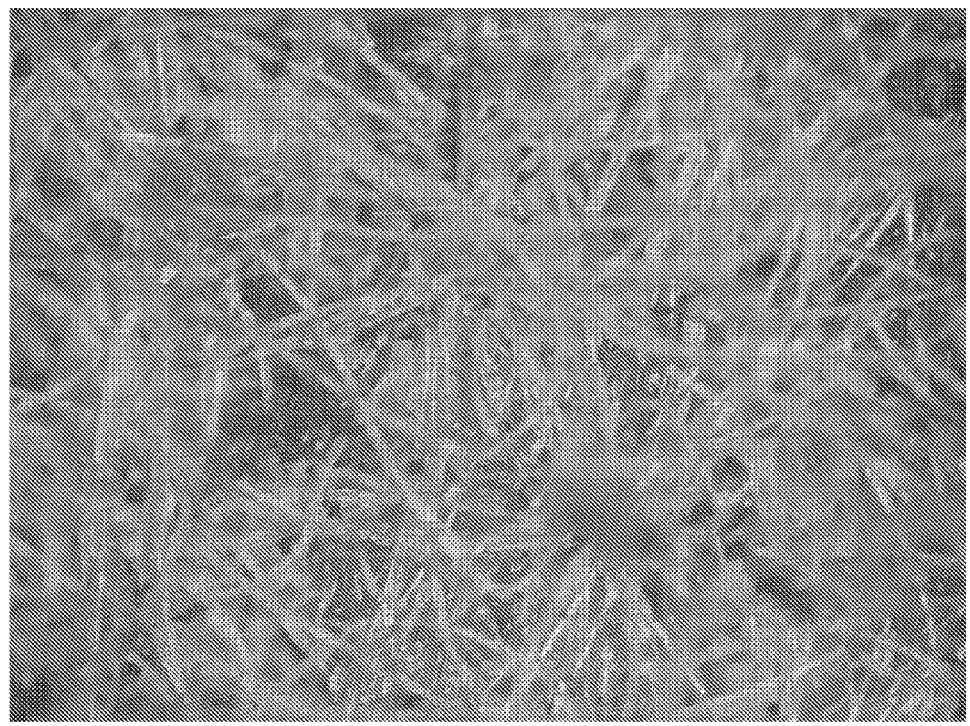
FIG. 5 is a photomicrograph of a nonwoven needlepunched textile-reinforced polymer composite material without carbon nanomaterial.
Figure 6:
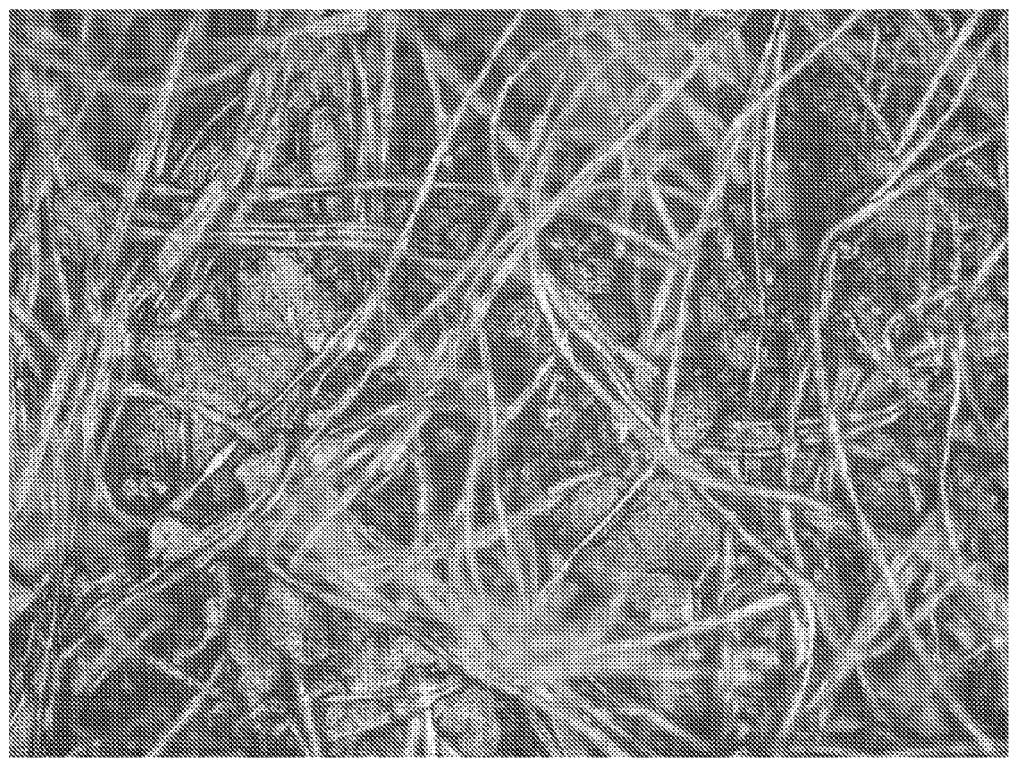
FIG. 6 is a photomicrograph of a nonwoven needlepunched textile-reinforced polymer composite material with carbon nanomaterial enhancers in accordance with the principles of the present invention.

FIGS. 5 and 6 are photomicrographs of a nonwoven needlepunched textile-reinforced composite with (FIG. 6) and without (FIG. 5) the carbon nanotubes and carbon nanofibers according to the present invention.

Example 1

A Kevlar staple fiber carded and needlepunched mat is prepared. Carbon nanofibers (from Pyrograph Products) in a polyimide resin liquid suspension is prepared with high speed mixing and liquid dilution. The mat is then saturated in the liquid suspension and pressed between compression rollers, and squeezed, as is know in the art. Multiple saturations and compressions alternated with vacuum impregnations wherein the mat and friction enhancing particles in the liquid are placed under vacuum until a cut cross-section of the wet mat indicates particle dispersion is followed. The composite is then dried resulting in a fiber to dry resin ratio of 50:50 compressed in a heated platen press to a desired porosity and then cured. The amount of carbon nanotube/nanofiber addition is calculated to achieve a 0.0359 volume fraction of the nanotubes/nanofibers in the cured composite.

Figure 7:
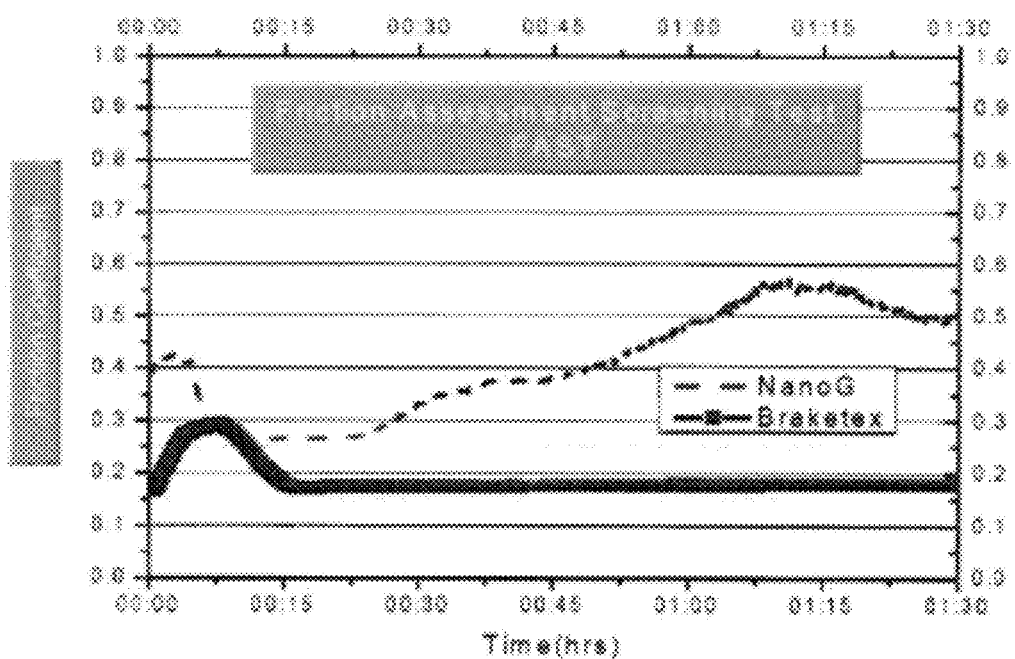
FIG. 7 is a graph of the coefficient of friction for a friction material containing carbon nanomaterials in accordance with embodiments of the present invention, versus friction material containing no carbon nanomaterials.

Since the porosity is controlled by the amount of platen compression independent of the addition of the friction enhancers, porous character of the composite is retained. A dynamometer test that compares this friction material to a like friction composite without the carbon nanotubes/nanofibers is the source of the data in FIG. 7. As shown in FIG. 7, the solid lines represents the non-woven needlepunched textile-reinforced composite without friction enhancers (the Braketex product from Tribco Inc., Cleveland, Ohio.) The dotted line represents the non-woven needlepunched textile-reinforced composite with a 0.0359 volume fraction of carbon nanotubes and carbon nanofibers. The dotted line indicates an increased dynamic coefficient of friction, independent of the energy input and temperature.

Examples 2-8

Friction composites were prepared as in Example 1, but including various volume fraction percentage levels of different carbon nanotubes (from Carbon Nanotechnologies, Houston Tex.) and carbon nanofibers (from Pyrograph Products; Cedarville, Ohio), and these composites were cut and bonded to metal carrier plates for use as dry brake plates. The plates were tested on a friction dynamometer which had been arranged to test at high energy levels and friction surface temperatures that simulate aircraft landing brake applications.

The table shows friction results at a high energy level chosen to show heat fade. The high temperature performance extends over a 40 to 50 sec. slipping engagement at 4.0 KJ/cm$^2$. This is the total energy of the engagement per area of composite friction surface rotating opposed to a cast iron stator, and where: "μ (hot)" is the dynamic coefficient of friction measured at the highest temperature point of the test engagement. "Temperature" is the hottest point during the time of friction engagement. "Δμ" is the fade, which is an indication of the approximate loss of the dynamic coefficient of friction which is proportional to loss of effective stopping force due mainly to the heat of engagement.

| EXAMPLES 2-8 | | | | |
| --- | --- | --- | --- | --- |
| EXAMPLE | VOLUME FRACTION OF NANOMATERIAL | μ (hot) | Temperature (deg. C.) | Δμ (fade) |
| 2 | 0 | 0.11 | 435 | 0.19 |
| 3 | 0.0059 carbon nanotubes | 0.14 | 508 | 0.14 |
| 4 | 0.0134 carbon nanofibers | 0.12 | 473 | 0.03 |
| 5 | 0.0121 carbon nanofibers | 0.13 | 475 | 0 |

-continued

EXAMPLES 2-8

| EXAMPLE | VOLUME FRACTION OF NANOMATERIAL | μ (hot) | Temperature (deg. C.) | Δμ (fade) |
|---|---|---|---|---|
| 6 | 0.0197 carbon nanotubes | 0.16 | 611 | 0.14 |
| 7 | 0.0359 carbon nanofibers | 0.14 | 562 | 0.06 |
| 8 | 0.0658 carbon nanotubes | 0.12 | 675 | 0.08 |

It is apparent that the six brake plates with nano enhancers (Examples 3-8) showed substantially higher coefficients of friction at elevated temperatures than the standard without enhancers (Example 2). It is also apparent that the enhancers reduced the difference between dynamic coefficients of friction between those at the beginning of friction engagement and before the end of the engagement at which point the friction interface is at its maximum temperature. This would result in the improvement of more uniform pressure being applied during the stop. Generally increasing temperatures with proportions of increasing enhancers indicate more heat energy being conducted to the opposing surfaces which dissipate energy away from the mechanisms. This improvement would tend to degrade the composites less. As seen in FIGS. 5 and 6, the materials also retain their porosity beside their enhancer additions. The enhancers do not significantly effect the open porosity character of the composite. These results would not be expected by similar additions of fillers, powders or any other additives to the NNTRC's.

Together with additional tests it is indicated that friction enhancing particle additions below about 0.004 volume fraction of the composite or above about 0.080 did not exhibit further improvements beyond those within that range of volume fractions.

Example 9

In order to demonstrate the versatility of the invention to utilize other fibers and resins as well as the effect on the friction surface by volume proportion measurements, a carded and needlepunched friction mat is prepared as in previous examples, but using an 80% by weight glass fiber and 20% polyacrylonitrile fibers in a phenolic resin matrix (to obtain a dried composite having a fiber to resin ratio 80:20). The specific gravity of this mat is much higher than the previous examples. Due to the increased specific gravity of the mat, in order to obtain a comparable porous product with a comparable area of friction enhancers at the operating surface, as was made in Examples 1-8, approximately 30% less friction enhancers on a weight basis are measured and mixed into the resin. Conversely, a composite prepared with friction enhancers on an equal weight basis to another composite having a lighter specific gravity mat, leads to excess carbon nanotube and/or carbon nanofiber and higher cost. Therefore, preparing products based on the volume fraction of the additives specifies properties that actually are quantified for the friction surface and are more effectively utilized by the product.

The friction materials of these examples can be applied as friction linings or facings to appropriate metal backings for use as brake pads, clutch plates, automatic transmission friction discs, transmission or brake bands, torque converters, slip differential friction products, and the like. Alternatively, non-metal backings are attached or no backings wherein the friction materials employed as free-floating devices are used for friction products.

It is apparent that improved friction materials can be obtained when employing carbon nanotubes and carbon nanofibers in volume proportions of approximately 0.004 to 0.080 by volume fraction of nonwoven needlepunched textile-reinforced polymer matrix friction composites.

The inventors believe that due to the unique presence of a large number of carbon edges with both carbon nanofibers as well as carbon nanotubes small volume proportions of either or both of these materials produce improvements in nonwoven needlepunched textile-reinforced composites without substantially effecting their porous structure or the character of the material as a whole. Among other things, it may be the increased thermal conductivity along the length and micro structure of the fibers and tubes compared to materials used as fillers, that conducts heat to surrounding parts, and results in higher coefficients of friction at elevated temperatures. The fibers'/tubes/large increase in material fracture strain, on the order of five times that of the carbon fibers known in the art, introduces asperities of increased flex modulus and heat resistance at the friction surface, and possibly accounts for their enhancing effect.

The description of the invention is merely exemplary in nature and, thus, variations that do not depart from the substance of the invention are intended to be within the scope of the invention. Such variations are not to be regarded as a departure from the spirit and scope of the invention.

What is claimed is:

1. A composite friction material for use in friction applications comprising a nonwoven needlepunched fiber mat; a resin matrix impregnated in the fiber mat; and carbon nanotubes and/or carbon nanofibers dispersed on and within the resin matrix and fiber mat, comprising between approximately 0.0197 and approximately 0.080 by volume fraction of the composite material in an amount effective to improve the friction properties of the composite relative to the same composite without the carbon nanotubes and/or carbon nanofibers, the composite prepared by the process of dispersing carbon nanotubes and/or carbon nanofibers into a liquid resin to effect a homogeneous dispersion of separated particles of carbon nanotubes and/or carbon nanofibers, and thereafter saturating the mat with the homogeneous dispersion of separated particles of carbon nanotubes and/or carbon nanofibers and curing the resin to form the composite.

2. The composite friction material according to claim 1, wherein the resin matrix is selected from a group consisting of polyimide, phenolic, and epoxy.

3. The composite friction material according to claim 1, wherein the fiber mat is selected from a group comprising aramid, glass, ceramic, polyacrylnitrile and staple carbon or staple graphite fibers.

4. A friction product for use in a friction application comprising:
   a backing; and
   a friction composite according to claim 1 attached to the backing.

5. The friction product according to claim 4, wherein the friction product is selected from the group consisting of a dry brake plate, a wet brake plate, a clutch plate, a transmission friction disc, a transmission band, a brake band, a torque converter lining, a slip differential or synchronizer friction element, and a brake pad or block.

6. The friction product according to claim 4, wherein the composite comprises a resin matrix impregnated within and onto a nonwoven needlepunched textile-reinforced fiber mat.

7. The friction product according to claim 4, wherein the backing substrate is metal.

8. The friction product according to claim 4, wherein the backing substrate is plastic.

9. The friction product according to claim 4, wherein the friction element is a lining, facing, or unattached member.

10. The friction product according to claim 5, wherein the friction element is a facing.

11. The composite friction material according to claim 1, further comprising fillers dispersed within the resin.

12. A composite friction material comprising: a carded and needlepunched fiber mat is selected from a group comprising aramid, glass, ceramic, polyacrylonitrile and staple carbon or staple graphite fibers; a resin matrix impregnated within the fiber mat; and carbon nanotubes and/or carbon nanofibers dispersed within the resin matrix and comprising between approximately 0.0197 and approximately 0.080 by volume fraction of the composite material providing a proportion of carbon nanotubes and/or carbon nanofibers at the composite surface in an amount effective to improve the friction properties of the composite relative to the same composite without the carbon nanotubes and/or carbon nanofibers, the composite prepared by the process of dispersing carbon nanotubes and/or carbon nanofibers into a liquid resin to effect a homogeneous dispersion of separated particles of carbon nanotubes and/or carbon nanofibers, and thereafter saturating the mat with the homogeneous dispersion of separated particles of carbon nanotubes and/or carbon nanofibers and curing the resin to form the composite.

13. A composite friction material comprising: a nonwoven needlepunched fiber mat; a resin matrix impregnated in the needlepunched fiber mat; and carbon nanotubes and and/or carbon nanofibers dispersed on and within the resin matrix and fiber mat in an amount between approximately 0.0197 and approximately 0.080 by volume fraction of the composite friction material effective to increase the dynamic co-efficient of friction and to reduce the fade of the composite friction material the composite prepared by the process of dispersing carbon nanotubes and/or carbon nanofibers into a liquid resin to effect a homogeneous dispersion of separated particles of carbon nanotubes and/or carbon nanofibers, and thereafter saturating the mat with the homogeneous dispersion of separated particles of carbon nanotubes and/or carbon nanofibers and curing the resin to form the composite.

14. The composite friction material according to claim 1 wherein the carbon nanotubes and/or carbon nanofibers are separated in solvent before mixing into the liquid resin.

15. The composite friction material according to claim 14 wherein the saturated mat is compression rolled to disperse the carbon nanotubes and/or carbon nanofibers into the mat.

16. The composite friction material according to claim 15 wherein the saturated mat is compression rolled multiple times to disperse the carbon nanotubes and/or carbon nanofibers into the mat.

17. The composite friction material according to claim 14 wherein a vacuum is applied between compression rollings.

* * * * *